US008452282B2

United States Patent
Masuda et al.

(10) Patent No.: US 8,452,282 B2
(45) Date of Patent: May 28, 2013

(54) MOBILE COMMUNICATION METHOD, MOBILE COMMUNICATION SYSTEM, PROGRAM, EXCHANGE, AND SPECIFIC RADIO BASE STATION

(75) Inventors: Masafumi Masuda, Yokosuka (JP); Kenichiro Aoyagi, Yokosuka (JP); Takaaki Sato, Kawasaki (JP); Ryoji Yamamoto, Fujisawa (JP)

(73) Assignee: NTT DoCoMo, Inc., Tokyo (JP)

( * ) Notice: Subject to any disclaimer, the term of this patent is extended or adjusted under 35 U.S.C. 154(b) by 238 days.

(21) Appl. No.: 12/935,783

(22) PCT Filed: Mar. 31, 2009

(86) PCT No.: PCT/JP2009/056745
§ 371 (c)(1),
(2), (4) Date: Dec. 22, 2010

(87) PCT Pub. No.: WO2009/123235
PCT Pub. Date: Oct. 8, 2009

(65) Prior Publication Data
US 2011/0117913 A1    May 19, 2011

(30) Foreign Application Priority Data
Mar. 31, 2008 (JP) ................................ 2008-093808

(51) Int. Cl.
*H04W 60/00*    (2009.01)

(52) U.S. Cl.
USPC ........ 455/435.1; 455/450; 455/522; 370/331; 370/338

(58) Field of Classification Search
USPC ................... 455/435.1, 435.2, 436, 437, 522, 455/450; 370/331, 338
See application file for complete search history.

(56) References Cited

U.S. PATENT DOCUMENTS

| 2004/0005897 A1* | 1/2004 | Tomoe et al. ................. 455/450 |
| 2007/0097938 A1* | 5/2007 | Nylander et al. ............. 370/338 |
| 2007/0097939 A1* | 5/2007 | Nylander et al. ............. 370/338 |
| 2007/0298824 A1* | 12/2007 | Ostman et al. ................ 455/522 |
| 2008/0304451 A1* | 12/2008 | Thompson .................... 370/331 |

FOREIGN PATENT DOCUMENTS

| JP | 8 214374 | 8/1996 |
| JP | 8-265825 | 10/1996 |
| JP | 2008 177743 | 7/2008 |

OTHER PUBLICATIONS

Office Action issued Oct. 19, 2010 in JP Application No. 2010-505957 (With English Translation).
Alcatel-Lucent, et al., "HNB/HeNB-Closed Subscriber Group (SCG) Requirements for UTRA and E-UTRA", 3GPP Technical Specification Group Services and System Aspects Meeting #39, TSGS#38(08)0188, SP-080188, Retrieved from the Internet: <URL:http://www.3gppl.com/ftp/tsg_sa/TSG_SA/TSGS_39/DOCs/SP-080188.zip>, Mar. 13, 2008.

* cited by examiner

*Primary Examiner* — David Q Nguyen
(74) *Attorney, Agent, or Firm* — Oblon, Spivak, McClelland, Maier & Neustadt, L.L.P.

(57) ABSTRACT

A mobile communication method includes a mobile station transmitting a location registration request on the basis of a pilot signal, a network device judging, in response to the received location registration request, whether or not access to a specific radio base station from the mobile station is permitted, the network device rejecting location registration processing when the access is judged not to be permitted, and the network device making a determination so that the transmission power of the pilot signal in the specific radio base station is reduced when the number of rejections of location registration processing exceeds a predetermined number of times.

17 Claims, 11 Drawing Sheets

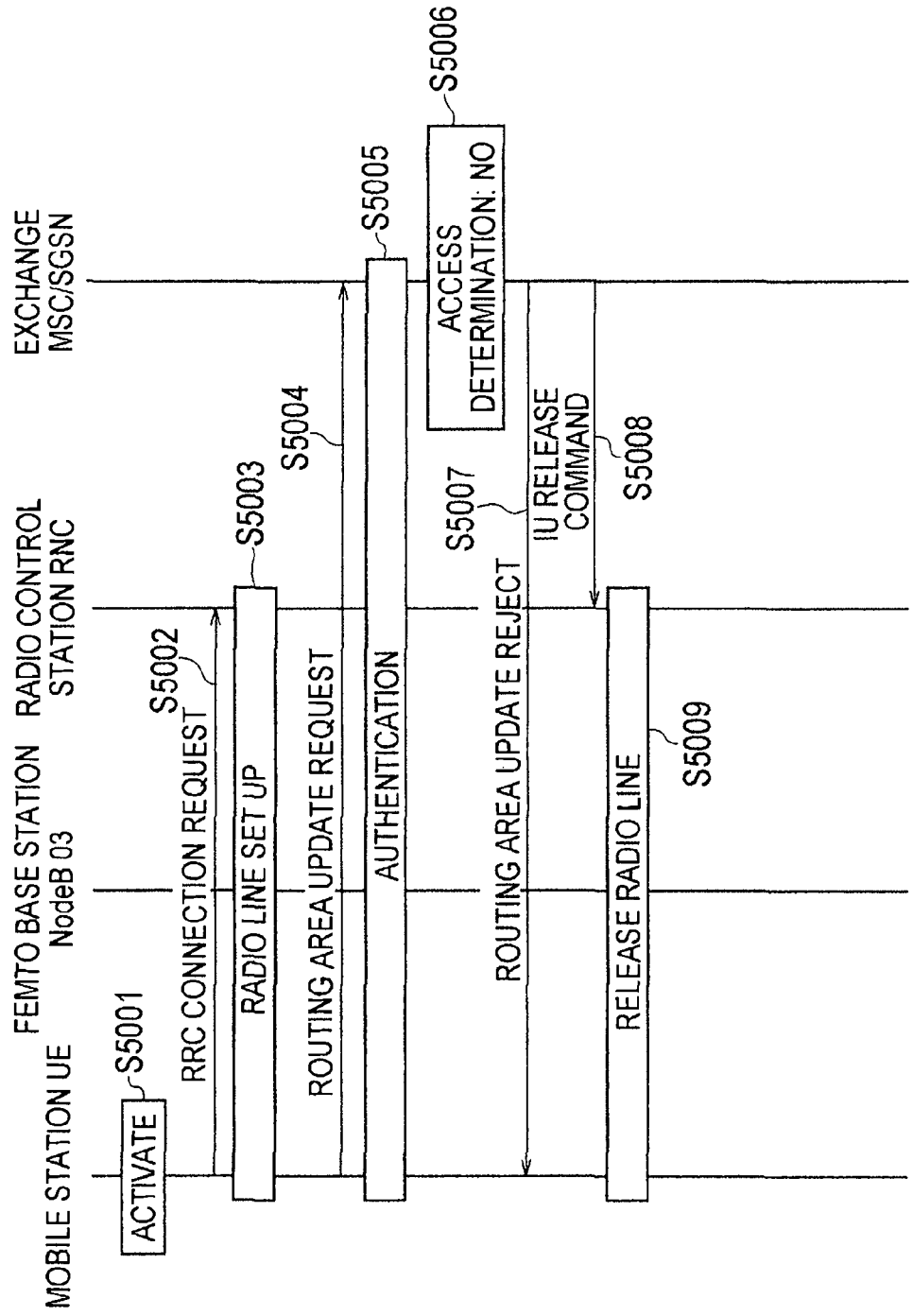

MOBILE COMMUNICATION METHOD, MOBILE COMMUNICATION SYSTEM, PROGRAM, EXCHANGE, AND SPECIFIC RADIO BASE STATION

TECHNICAL FIELD

The present invention relates to a mobile communication method, a mobile communication system, a program, an exchange, and a specific radio base station.

BACKGROUND ART

In recent years, a mobile communication system of a W-CDMA (Wideband-Code Division Multiple Access) scheme based on the Code Division Multiple Access (CDMA) technique or a mobile communication system called UMTS (Universal Mobile Telecommunication System) has been proposed and specified by 3GPP (3rd Generation Partnership Projects).

Here, a mobile communication system of the W-CDMA scheme will be described with reference to FIG. 11 and FIG. 12.

As shown in FIG. 11, the mobile communication system of the W-CDMA scheme includes a mobile station UE (User Equipment), radio base stations NodeB, radio control station RNC (Radio Network Controller), and an exchange MSC/SGSN (Mobile Switching Center/Serving GPRS Support Node) and thereby forms a mobile communication system of a cellular scheme. A unit of control of this cellular scheme is an area called a "cell".

Note that, although multiple exchanges MSC/SGSN are usually provided and are connected to one another in the above-described mobile communication system, a single exchange MSC/SGSN is illustrated in the example in FIG. 11 for the purpose of simplification.

Meanwhile, it is usual to provide the above-described mobile communication system with an apparatus called a home memory for storing subscriber information separately from the exchange. However, in the example in FIG. 11, functions of the home memory are assumed to be included in the exchange MSC/SGSN for the purpose of simplification.

Furthermore, introduction of a radio base station (a femto radio base station) for covering a narrow area such as an indoor area has advanced in recent years aside from a radio base station (a public radio base station) for covering a wide area such as an outdoor area.

As shown in FIG. 11, cells which are under the control of public radio base stations (radio base stations NodeB02 and NodeB02) are called as "macro cells (01, 02)" and a cell which is under the control of a femto radio base station (the femto radio base station NodeB03) is called as a "femto cell (03)".

Specifically, a private area (an area formed by one or more femto cells) for a specific mobile station UE is formed by locating femto radio base stations in a standard home, a small office or the like and applying an inexpensive home IP line for connection with a radio control station RNC. In that area, provision of "user-dedicated services" including, application of a charging system for the femto cell and offering of additional functions exclusive to the femto cell to the specific mobile station UE, have been studied.

In the mobile communication system of the W-CDMA scheme, a mobile station UE which is turned on but not performing communication, i.e., in a "standby state" of standing by for a calling operation attributable to a terminal operation by a user or for call reception of an incoming call, is configured to measure received power of a pilot signal sent out in each cell by the radio base station NodeB via a CPICH (Common Pilot Channel) and to select the optimum pilot signal (i.e., the cell corresponding to the optimum pilot signal) autonomously. Explanation of such a selection algorithm will be omitted herein.

The mobile station UE is configured to stand by in the cell when the mobile station UE has selected the optimum pilot signal (i.e., the cell corresponding to the optimum pilot signal). In this case, the mobile station UE is configured to execute location registration processing with that cell.

An operation of the location registration processing in a related art will be described with reference to FIG. 12.

In step S5001, the mobile station UE compares a location number of a cell included in notification information of a selected femto cell 03 with a location number of a cell stored in the mobile station UE.

When both of the numbers coincide with each other, the mobile station UE terminates this operation and continues to stand by in the femto cell 03.

On the other hand, if both of the numbers do not coincide with each other, the mobile station UE sets up a radio line with a radio control station RNC by transmitting a "RRC Connection Request message" to the radio control station RNC in steps S5002 and S5003, and then transmits a "Routing Area Update Request message (a location registration request)" to request the location registration processing concerning a location registration area (a paging area) including the selected femto cell 03 to the exchange MSC/SGSN in step S5004.

After authentication processing concerning the mobile station UE is executed in step S5005, the exchange MSC/SGSN makes reference to an access list and determines whether or not the mobile station UE is allowed to access to the femto cell 03 (the femto radio base station NodeB03) in step S5006.

In the example in FIG. 12, the mobile station UE is assumed to not be allowed to access to the femto cell 03 (the femto radio base station NodeB03). Hence the exchange MSC/SGSN transmits a "Routing Area Update Reject message (a location registration rejection response)" to the mobile station UE in step S5007.

The exchange MSC/SGSN transmits an "IU Release Command message" to the radio control station RNC in step S5008, and the radio line between the radio control station RNC and the mobile station UE is released in step S5009.

The mobile station UE rejected for the location registration processing as described above cannot enter the aforementioned standby state, and the operation in FIG. 12 will be repeated if the mobile station UE measures the received power of the pilot signal sent out in each cell via the CPICH again after a lapse of a predetermined time period and reselects the same femto cell 03 as the cell corresponding to the optimum pilot signal.

However, according to the conventional mobile communication system, there is a problem that the mobile station UE which is unable to enter the standby state in the femto cell 03 cannot enjoy a communication service in the vicinity of the femto cell 03.

Moreover, according to the conventional mobile communication system, there is another problem of concern to waste a battery of the mobile station UE because the cell selection processing and the location registration processing are repeated.

DISCLOSURE OF THE INVENTION

The present invention has therefore been made in view of the above-mentioned problems and an object thereof is to provide a mobile communication method, a mobile communication system, a program, an exchange, and a specific radio base station, which are capable of offering a communication service outside the femto cell 03 to the mobile station UE that cannot enter the standby state in the femto cell 03, and of saving the battery of the mobile station UE and improving convenience by avoiding repetition of the cell selection processing and the location registration processing.

A first aspect of the present invention is summarized as a mobile communication method comprise a step A of causing a mobile station to transmit a location registration request for requesting execution of location registration processing with a location registration area including a cell under the control of a specific radio base station based on a received pilot signal, a step B of causing a network apparatus to determine whether or not the mobile station is allowed to access to the specific radio base station based on the location registration request received from the mobile station, a step C of causing the network apparatus to reject the location registration processing when the mobile station is determined to be not allowed to access to the specific radio base station and a step D of causing the network apparatus to make a decision to reduce transmission power of the pilot signal in the specific radio base station when the number of times of rejection of the location registration processing exceeds a predetermined number of times.

In the first aspect, wherein the network apparatus accumulates the number of times of rejection of the location registration processing and clears the accumulated number of times of rejection of the location registration processing when the location registration processing is not rejected for a predetermined time period.

In the first aspect, wherein, in the step D, the network apparatus determines whether or not to reduce the transmission power of the pilot signal in the specific radio base station depending on a communication status of a specific mobile station allowed to access to the specific radio base station.

In the first aspect, wherein, even if the mobile station is determined to be not allowed to access to the specific radio base station, the network apparatus does not reject the location registration processing when the number of times of rejection of the location registration processing has exceeded a predetermined number of times.

In the first aspect, wherein, in the step C, the network apparatus changes a factor to be included in a location registration rejection response to provide notification of rejection of the location registration processing depending on the number of times of the rejection of the location registration processing.

In the first aspect, wherein, in the step D, the network apparatus determines whether or not to reduce the transmission power of the pilot signal in the specific radio base station depending on an overlay condition of another cell on the cell under the control of the specific radio base station.

In the first aspect, wherein the network apparatus makes a decision to turn the transmission power of the pilot signal in the specific ration base station back to an initial value after a lapse of a predetermined time period.

A second aspect of the present invention is summarized as a mobile communication system configured to cause a mobile station to transmit a location registration request for executing location registration processing with a location registration area including a cell under the control of a specific radio base station based on a received pilot signal, the mobile communication system comprise an access determination unit configured to determine whether or not the mobile station is allowed to access to the specific radio base station based on the location registration request received from the mobile station, a location registration processor unit configured to reject the location registration processing when the mobile station is determined to be not allowed to access to the specific radio base station and a change determination unit configured to make a decision to reduce transmission power of the pilot signal in the specific radio base station when the number of times of rejection of the location registration processing exceeds a predetermined number of times.

In the second aspect, the mobile communication system comprise a storage unit accumulating the number of times of rejection of the location registration processing and being configured to clear the accumulated number of times of rejection of the location registration processing when the location registration processing is not rejected for a predetermined time period.

In the second aspect, wherein the change determination unit determines whether or not to reduce the transmission power of the pilot signal in the specific radio base station depending on a communication status of a specific mobile station allowed to access to the specific radio base station.

In the second aspect, wherein, even if the mobile station is determined to be not allowed to access to the specific radio base station, the location registration processor unit does not reject the location registration processing when the number of times of rejection of the location registration processing has exceeded a predetermined number of times.

In the second aspect, wherein the location registration processor unit changes a factor to be included in a location registration rejection response to provide notification of rejection of the location registration processing depending on the number of times of the rejection of the location registration processing.

In the second aspect, wherein the change determination unit determines whether or not to reduce the transmission power of the pilot signal in the specific radio base station depending on an overlay condition of another cell on the cell under the control of the specific radio base station.

In the second aspect, wherein the change determination unit makes a decision to turn the transmission power of the pilot signal in the specific ration base station back to an initial value after a lapse of a predetermined time period.

A third aspect of the present invention is summarized as a program causing a computer to operate as the mobile communication system.

A fourth aspect of the present invention is summarized as an exchange configured to cause a mobile station to transmit a location registration request for executing location registration processing with a location registration area including a cell under the control of a specific radio base station based on a received pilot signal, the exchange comprise an access determination unit configured to determine whether or not the mobile station is allowed to access to the specific radio base station based on the location registration request received from the mobile station, a location registration processor unit configured to reject the location registration processing when the mobile station is determined to be not allowed to access to the specific radio base station and a change determination unit configured to make a decision to reduce transmission power of the pilot signal in the specific radio base station when the number of times of rejection of the location registration processing exceeds a predetermined number of times.

A fifth aspect of the present invention is summarized as a specific radio base station configured to cause a mobile station to transmit a location registration request for executing location registration processing with a location registration area including a cell under the control of a specific radio base station based on a received pilot signal, the specific radio base station comprise an access determination unit configured to determine whether or not the mobile station is allowed to access to the specific radio base station based on the location registration request received from the mobile station, a location registration processor unit configured to reject the location registration processing when the mobile station is determined to be not allowed to access to the specific radio base station and a change determination unit configured to make a decision to reduce transmission power of the pilot signal in the specific radio base station when the number of times of rejection of the location registration processing exceeds a predetermined number of times.

BRIEF DESCRIPTION OF THE DRAWINGS

FIG. 12 is a sequence diagram showing an operation at the time of location registration processing in the mobile communication system of the typical W-CDMA scheme.

BEST MODES FOR CARRYING OUT THE INVENTION (Configuration of Mobile Communication System According to First Embodiment of the Present Invention)

Figure 1:
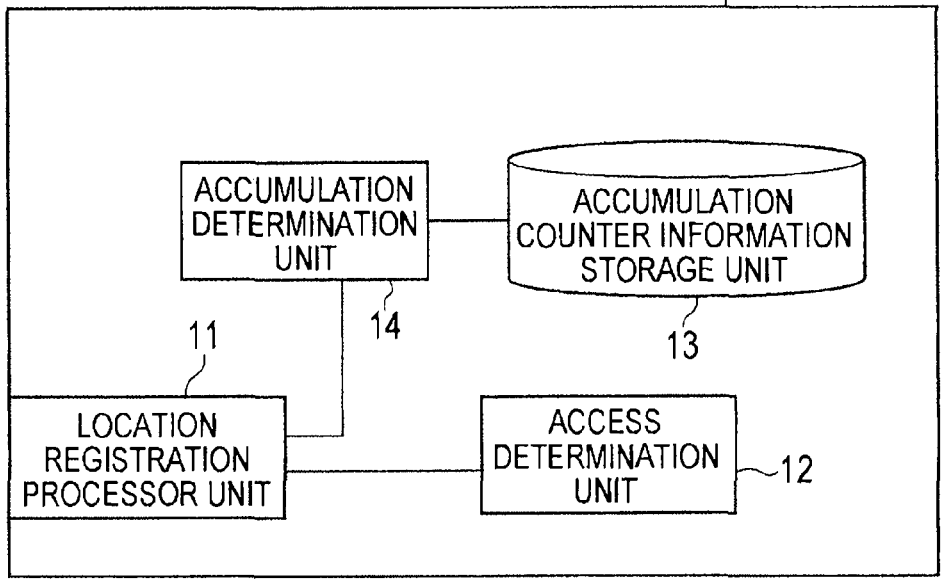
FIG. 1 is a functional block diagram of an exchange according to a first embodiment of the present invention.
Figure 11:
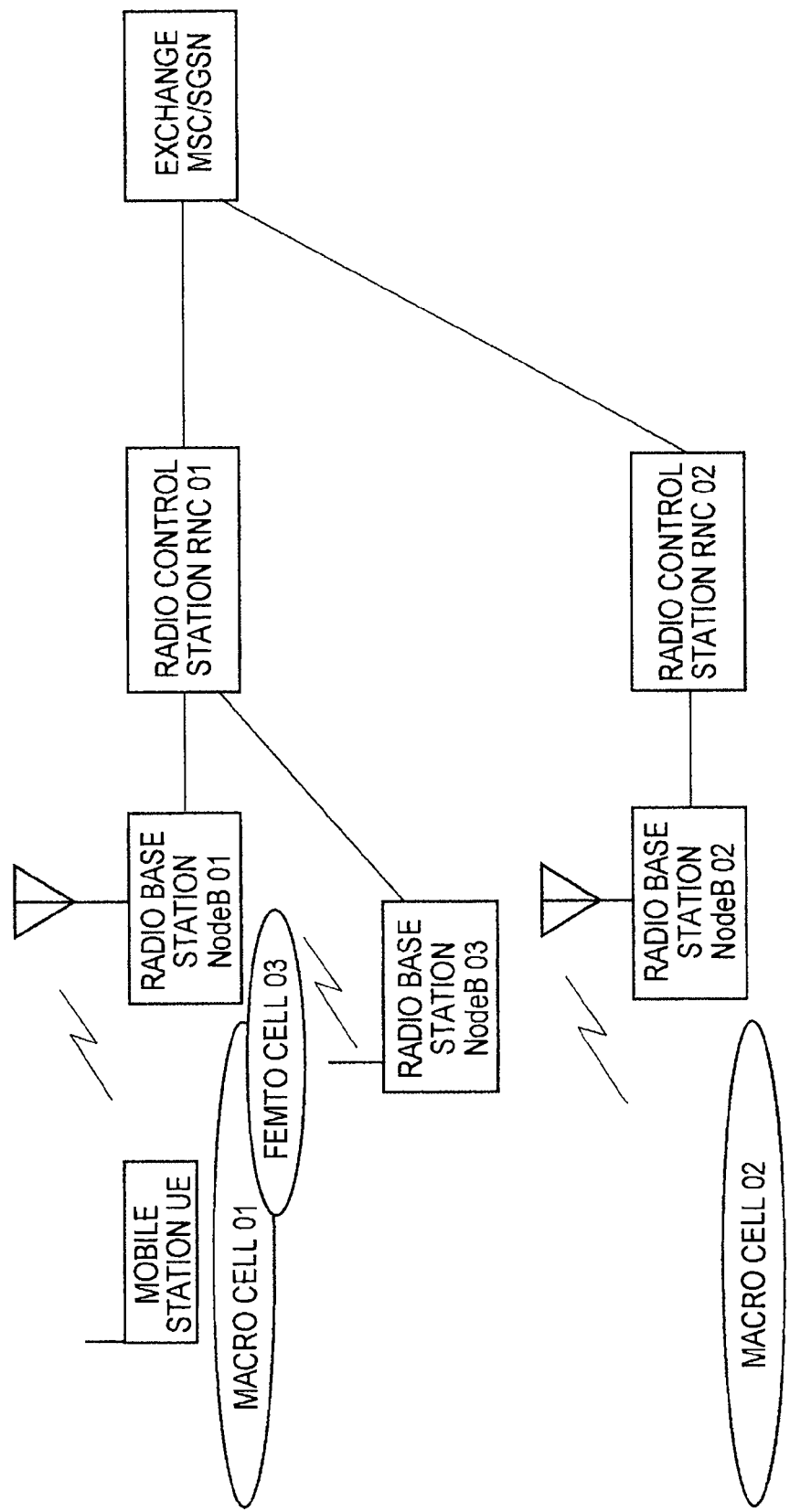
FIG. 11 is an overall configuration diagram of a mobile communication system of a typical W-CDMA scheme.

A configuration of a mobile communication system according to a first embodiment of the present invention will be described with reference to FIG. 1 and FIG. 2. Here, as shown in FIG. 1, the configuration of the mobile communication system according to this embodiment is similar to the above-described configuration shown in FIG. 11.

Note that radio base stations NodeB01 and NodeB02 are assumed to be public radio base stations for covering macro cells 01 and 02 in an indoor space, which are installed by a communication common carrier or the like.

Meanwhile, a femto radio base station NodeB03 is assumed to be a micro radio station for covering a femto cell 03 mainly in an indoor space, which is installed in a standard home, a small office or the like by a general user, the communication common carrier or the like.

Here, the femto radio base station NodeB03 may be connected to a radio control station RNC01 via an inexpensive IP line for domestic use, for example.

Meanwhile, the femto radio base station NodeB03 may be configured to offer "user-dedicated services" to a specific mobile station UE allowed to access to the femto radio base station NodeB03.

Here, as described previously, the "user-dedicated services" are expected to offer a billing system in the femto cell 03 which is different from a billing system in the macro cells and to offer additional functions exclusive to the femto cell 03.

In the meantime, the mobile communication system according to this embodiment is configured to determine appropriateness to execute location registration processing of the mobile station UE with the cell which is under the control of the radio base station NodeB that can be set either to an open state (Open) or to a closed state (Closed).

Meanwhile, it is also usual to provide this mobile communication system with an apparatus called a home memory for storing subscriber information separately from an exchange MSC/SGSN. However, in this embodiment as well, functions of the home memory are assumed to be included in the exchange MSC/SGSN for the purpose of simplification.

As shown in FIG. 1, the exchange MSC/SGSN according to this embodiment includes a location registration processor 11, an access determination unit 12, an accumulation counter information storage unit 13, and an accumulation determination unit 14.

The location registration processor 11 is configured to execute location registration processing of the mobile station UE with a location registration area including the cell under the control of the radio base station NodeB designated by a "Routing Area Update Request message (a location registration request)" transmitted from the mobile station UE.

Here, the mobile station UE is configured to measure received power of a pilot signal received from each cell via a CPICH and to transmit the "Routing Area Update Request message (a location registration request)" for requesting execution of the location registration processing with the location registration area including the cell that corresponds to the pilot signal having the best received power.

The access determination unit 12 is configured to determine whether or not the mobile station UE is allowed to access to the femto radio base station NodeB03, i.e., whether or not to allow the location registration processing of the mobile station UE with the location registration area including the femto cell 03 which is under the control of the femto radio base station NodeB03 when the femto cell 03 under the control of the femto radio base station NodeB03 (a specific radio base station) is designated by the "Routing Area Update Request message (the location registration request)" received from the mobile station UE.

Here, the location registration processor 11 is configured to reject the location registration processing of the mobile station UE with the location registration area including the femto cell 03 under the control of the femto radio base station NodeB03 when the access determination unit 12 determines that the mobile station UE is not allowed to access to the femto radio base station NodeB03.

To be more precise, the location registration processor 11 is configured to transmit a "Routing Area Update Reject message (a location registration rejection response)" indicating such an effect to the radio control station RNC when the location registration processing of the mobile station UE with the location registration area including the femto cell 03 under the control of the femto radio base station NodeB03 is determined to be rejected.

Alternatively, the location registration processor 11 may be configured not to reject the location registration processing even if the access determination unit 12 has determined that the mobile station UE is not allowed to access to the specific radio base station when the number of times of rejection of the above-described location registration processing exceeds a predetermined number of times.

Meanwhile, the location registration processor 11 may be configured to change a factor (Cause) to be included in the "Routing Area Update Reject message (the location registration rejection response)" for providing notification of rejection of the location registration processing depending on the number of times of rejection of the above-described location registration processing.

For example, rejection due to a temporary reason such as network congestion may be represented as the factor (Cause) of rejection until an "accumulation counter" to be described later exceeds a predetermined number of times while rejection due to a reason that the location registration processing is not permitted may be represented as the factor (Cause) of rejection after the "accumulation counter" to be described later has exceeded the predetermined number of times.

Here, the mobile station UE may be configured to repeat the location registration processing with the location registration area including the same cell after a lapse of a predetermined time period when receiving the "Routing Area Update Reject message (the location registration rejection response)" that contains the former factor (Cause) and to execute the location registration processing with a location registration area including a different cell without repeating the location registration processing with the location registration area including the same cell when receiving the "Routing Area Update Reject message (the location registration rejection response)" that contains the latter factor (Cause).

Figure 4:
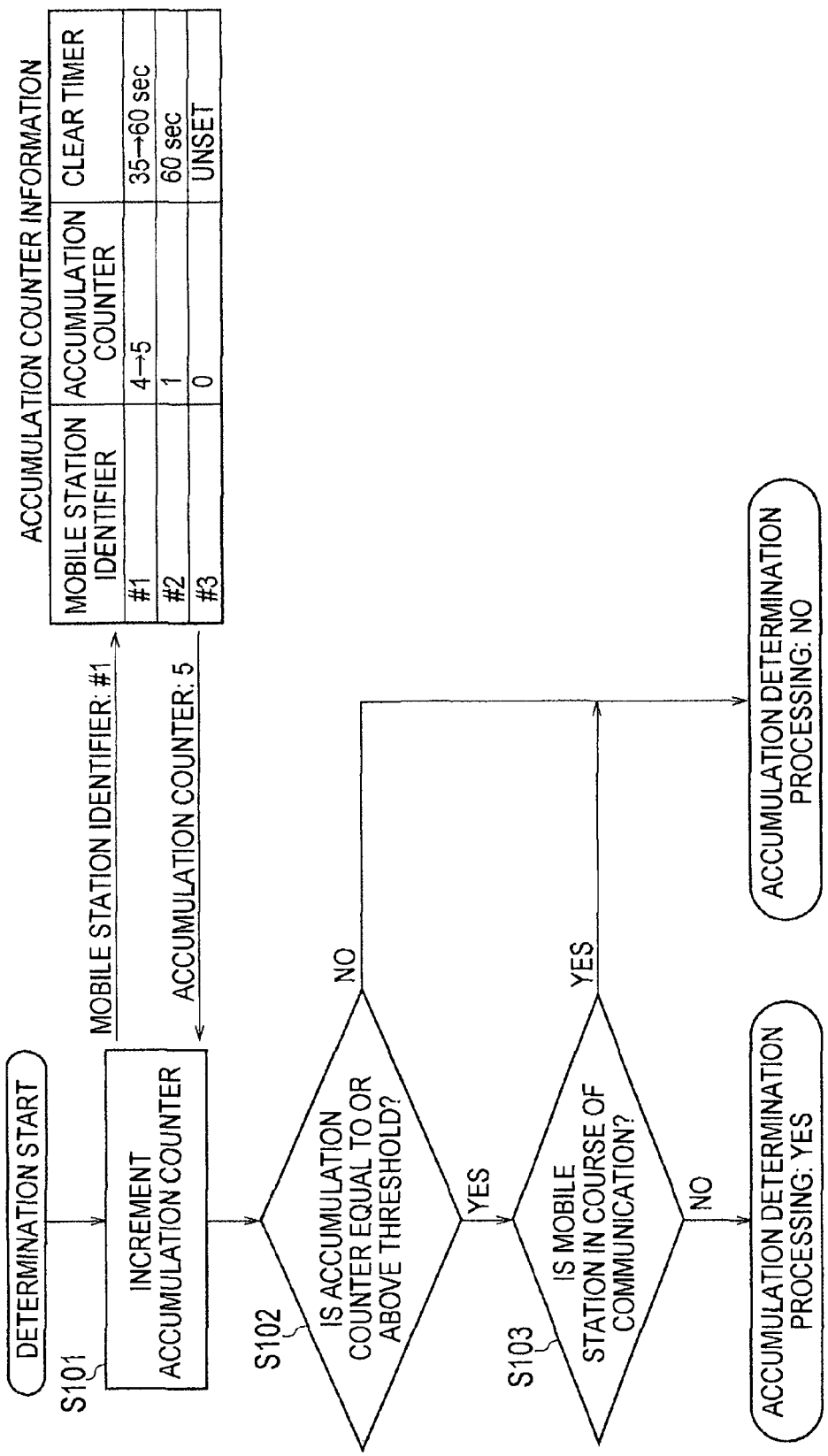
FIG. 4 is a flowchart showing an operation at the time of accumulation determination processing by the exchange according to the first embodiment of the present invention.
Figure 5:
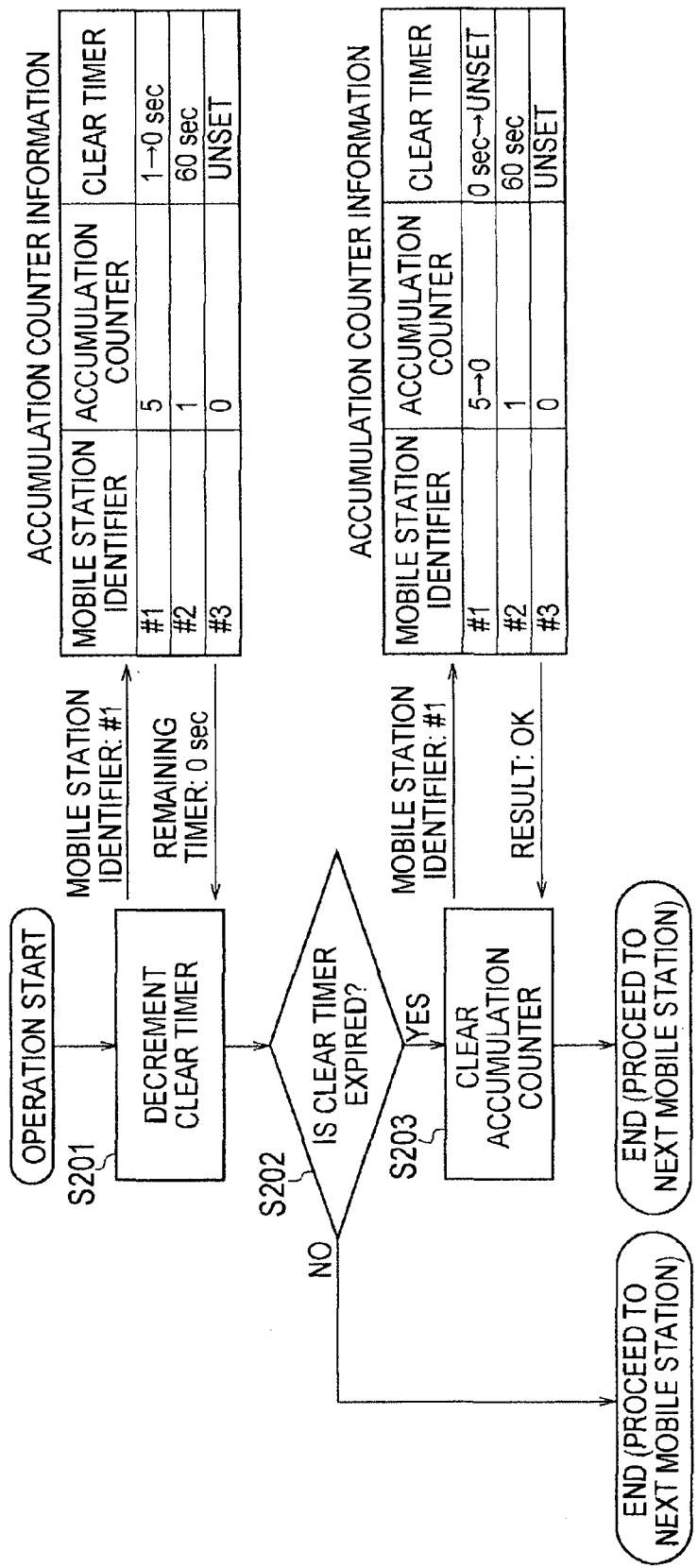
FIG. 5 is a flowchart showing an operation at the time of accumulation counter clearing processing by the exchange according to the first embodiment of the present invention.

The accumulation counter information storage unit 13 is configured to store accumulation counter information that links a "mobile station identifier" with an "accumulation counter" and a "clear timer" (see FIG. 4 and FIG. 5).

Here, the "accumulation counter" indicates the number of times of rejection of the location registration processing of the mobile station UE identified by the "mobile station identifier" with the location registration area including the cell (such as the femto cell 03) under the control of the specific radio base station.

The "clear timer" indicates a predetermined time period representing time to clear the "accumulation counter (the accumulated number of times of rejection of the location registration processing)" when the above-described location registration processing is not rejected.

Here, the accumulation counter information storage unit 13 is configured to clear the number of times of rejection of the location registration processing accumulated in the "accumulation counter" when the location registration processing of the mobile station UE identified by the "mobile station identifier" with the location registration area including the cell (such as the femto cell 03) under the control of the specific radio base station is not rejected for the predetermined time period set in the "clear timer".

The accumulation determination unit 14 is configured to execute accumulation determination processing to be described later by using FIG. 4.

The configuration of the location registration processor 11 is such that, when a result of the accumulation determination processing is "Yes" (when the number of times of rejection of the above-described location registration processing exceeds the predetermined number of times or when the specific mobile station allowed to access to the above-described specific radio base station is in the course of communication, for example), the location registration processor 11 includes information indicating such an effect in an "IU Release Command message (a radio line release instruction)" and transmits the message to the radio control station RNC.

On the other hand, the location registration processor 11 is configured to transmit a regular "IU Release Command message (the radio line release instruction)" to the radio control station RNC when the result of the accumulation determination processing is "No".

Figure 2:
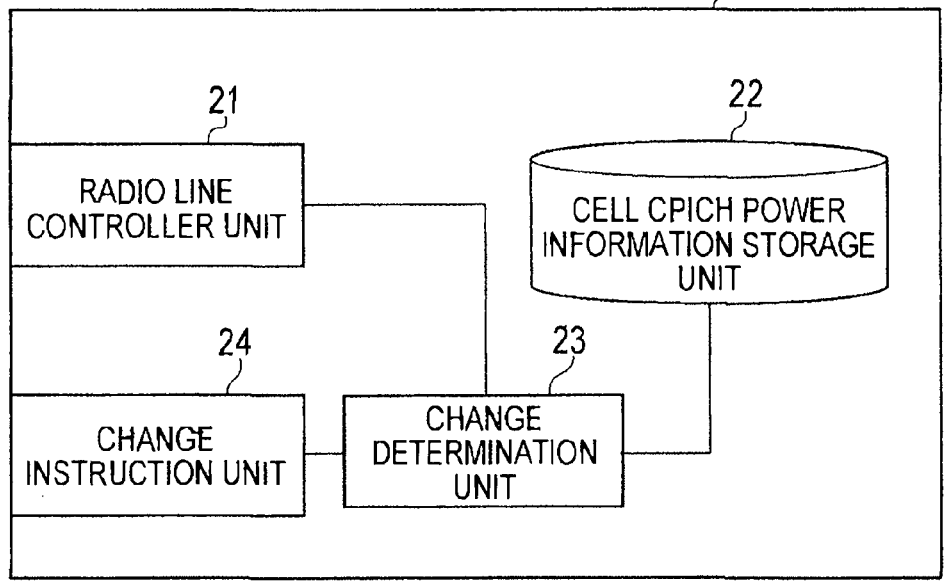
FIG. 2 is a functional block diagram of a radio control station according to the first embodiment of the present invention.

As shown in FIG. 2, the radio control station RNC according to this embodiment includes a radio line controller 21, a cell CPICH power information storage unit 22, a change determination unit 23, and a change instruction unit 24.

The radio line controller 21 is configured to set up or to release a radio line (such as RRC connection) with the mobile station UE.

The cell CPICH power information storage unit 22 is configured to store cell CPICH power information that links a "cell identifier" with "CPICH power", an "initial value", a "lower limit", a "step width", and a "recovery timer".

The "CPICH power" represents a current value of transmission power of a pilot signal via the CPICH in the cell identified by the "cell identifier". The "initial value" represents an initial value of the transmission power of the pilot signal via the CPICH in the cell identified by the "cell identifier". The "lower limit" represents a lower limit of the transmission power of the pilot signal via the CPICH in the cell identified by the "cell identifier".

The "step width" represents a reduction width of the transmission power of the above-described pilot signal while the "recovery timer" represents a predetermined time period which is the time period for turning the transmission power of the above-described pilot signal back to the initial value.

The change determination unit 23 is configured to execute CPICH power reduction processing to be described later by using FIG. 6 when detecting that the result of the above-described accumulation determination processing in the received "IU Release Command message (the radio line release instruction)" is "Yes".

The change determination unit 23 is configured to determine whether or not to reduce the transmission power of the pilot signal via the CPICH in the above-described specific radio base station (such as the femto radio base station NodeB03) depending on a result of the CPICH power reduction processing.

To be more precise, the change determination unit 23 is configured to make a decision so as to reduce the transmission power of the pilot signal via the CPICH in the above-described specific radio base station (such as the femto radio base station NodeB03) when the result of the CPICH power reduction processing is "Yes".

For example, the change determination unit 23 may be configured to determine whether or not to reduce the transmission power of the pilot signal via the CPICH in the specific radio base station depending on an overlay condition of another cell on the cell (such as the femto cell 03) under the control of the specific radio base station (such as the femto radio base station NodeB03).

Here, the change determination unit 23 may be configured to make a decision to turn the transmission power of the above-described pilot signal back to the initial value after a lapse of a predetermined time period.

The configuration of the change instruction unit 24 is such that, when the decision is made by the change determination unit 23 so as to reduce the transmission power of the pilot signal via the CPICH in the above-described specific radio base station (such as the femto radio base station NodeB03), the change instruction unit 24 instructs such an effect to the specific radio base station by using a "Cell Reconfiguration Request message" or the like.

(Operations of Mobile Communication System According to First Embodiment of the Present Invention)

Operations of the mobile communication system according to the first embodiment of the present invention will be described with reference to FIG. 3 to FIG. 8.

First, an operation of the mobile communication system according to the first embodiment of the present invention when the location registration processing of the mobile station UE with the location registration area including the femto cell 03 under the control of the femto radio base station NodeB03 is rejected will be described with reference to FIG. 3 to FIG. 6.

Figure 3:
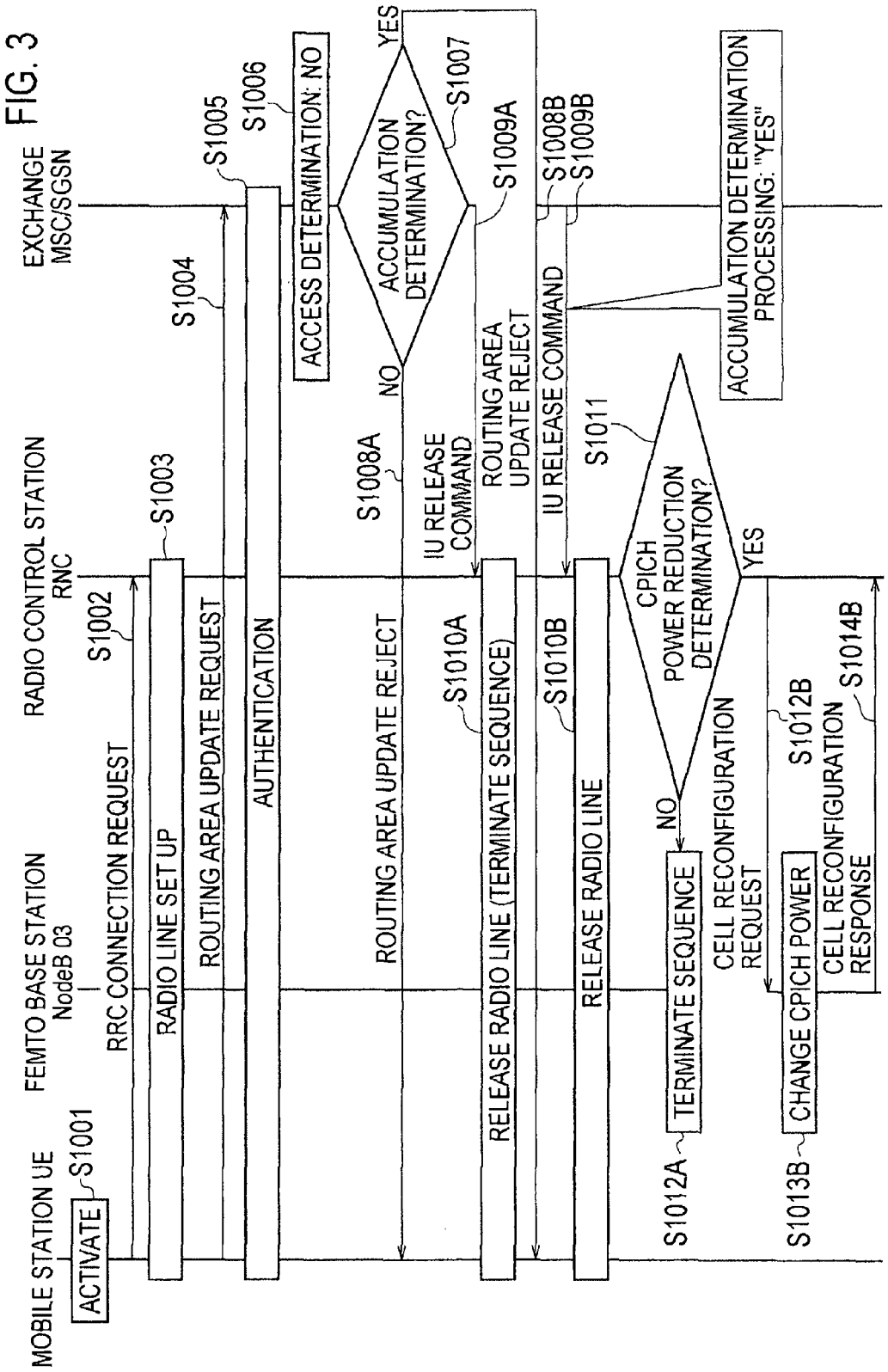
FIG. 3 is a sequence diagram showing an operation at the time of location registration processing in a mobile communication system according to the first embodiment of the present invention.

As shown in FIG. 3, in step S1001, the mobile station UE compares a location number (an identifier of a paging area where the femto cell 03 belongs to) of the cell (femto cell 03) included in notification information of the cell corresponding to the pilot signal having the best received power with a location number (an identifier of a paging area where the cell 01 belongs to) of the cell (the macro cell 01) stored in the mobile station UE.

When both of the numbers coincide with each other, the mobile station UE terminates this operation and continues to stand by in the macro cell 01 where the location registration processing has been performed (where the mobile station UE is standing by).

On the other hand, if both of the numbers do not coincide with each other, the mobile station UE sets up a radio line with a radio control station RNC01 by transmitting a "RRC Connection Request message" to the radio control station RNC01 in steps S1002 and S1003, and then transmits a "Routing Area Update Request message" for requesting the location registration processing concerning a location registration area including the femto cell 03 to the exchange MSC/SGSN in step S1004.

After authentication processing concerning the mobile station UE is executed in step S1005, the exchange MSC/SGSN determines whether or not the mobile station UE is allowed to access to the femto cell 03 in step S1006.

Since the access of the mobile station UE to the femto cell 03 is not allowed in this embodiment, the exchange MSC/SGSN executes the accumulation determination processing in step S1007. Now, the accumulation determination processing will be described below with reference to FIG. 4.

As shown in FIG. 4, in step S101, the accumulation determination unit 14 of the exchange MSC/SGSN acquires the "accumulation counter" corresponding to the "mobile station identifier (#1 in the example of FIG. 4)" of the mobile station UE from the accumulation counter information storage unit 13.

At this point, the accumulation counter information storage unit 13 increments the "accumulation counter" by one (the "accumulation counter" is incremented from "4" to "5" in the example of FIG. 4) and then transmits the "accumulation counter" to the accumulation determination unit 14.

In step S102, the accumulation determination unit 14 determines whether or not the acquired "accumulation counter" is equal to or above a "predetermined threshold", i.e., whether or not the number of times of rejection of the location registration processing of the mobile station UE with the location registration area including the femto cell 03 is equal to or above the predetermined number of times.

Here, the "predetermined threshold (predetermined number of times)" only needs to be defined in advance as system data or the like and to be saved physically in a memory, a hard disk or the like as similar to the accumulation counter information.

The operation goes to step S103 when the "accumulation counter" is determined to be equal to or above the "predetermined threshold". When the "accumulation counter" is determined not to be equal to or above the "predetermined threshold", the accumulation determination unit 14 determines the result of the accumulation determination processing as "No".

In step S103, the accumulation determination unit 14 determines whether or not the specific mobile station (a home mobile station) allowed to access to the above-described specific radio base station is in the course of communication.

The accumulation determination unit 14 determines the result of the accumulation determination processing as "No" when the specific mobile station (the hole mobile station) is determined to be in the course of communication. The accumulation determination unit 14 determines the result of the accumulation determination processing as "Yes" when the specific mobile station (the hole mobile station) is determined to be not in the course of communication.

Now, accumulation counter clearing processing for clearing the above-described "accumulation counter" will be described with reference to FIG. 5. Note that the accumulation counter clearing processing is started every second, for example, and is repeatedly executed for all the mobile stations UE.

As shown in FIG. 5, in step S201, the accumulation counter information storage unit 13 decrements counts of the "clear timer" corresponding to the "mobile station identifier" of the relevant mobile station UE.

When the "clear timer" is not expired, i.e., when the "clear timer" is not set to "0" in step S202, the accumulation counter information storage unit 13 terminates the accumulation counter clearing processing for the mobile station UE and starts the accumulation counter clearing processing concerning the next mobile station UE.

On the other hand, when the "clear timer" is expired, i.e., when the "clear timer" is set to "0" in step S202, the accumulation counter information storage unit 13 clears the "accumulation counter" for the mobile station UE and causes the "clear timer" to transit to an "unset state" in step S203, then terminates the accumulation counter clearing processing for the mobile station UE, and starts the accumulation counter clearing processing concerning the next mobile station UE.

Back to FIG. 3, when the result of the accumulation determination processing is "No", the exchange MSC/SGSN transmits the "Routing Area Update Reject message (the location registration rejection response)" to the mobile station UE in step S1008A, then transmits the "IU Release Command message" to the femto radio base station NodeB03 in step S1009A, and releases the radio line established between the radio control station RNC and the mobile station UE in step S1010A.

On the other hand, when the result of the accumulation determination processing is "Yes", the exchange MSC/SGSN transmits the "Routing Area Update Reject message (the location registration rejection response)" to the mobile station UE in step S1008B, then transmits the "IU Release Command message" to the femto radio base station NodeB03 in step S1009B so as to notify that the result of the accumulation determination processing is "Yes", and releases the radio line established between the radio control station RNC and the mobile station UE in step S1010B.

Thereafter, in step S1011, the change determination unit 23 of the radio control station RNC executes CPICH power reduction determination processing in response to the "IU Release Command message" in step S1009B. Now, the CPICH power reduction determination processing will be described below with reference to FIG. 6.

Figure 6:
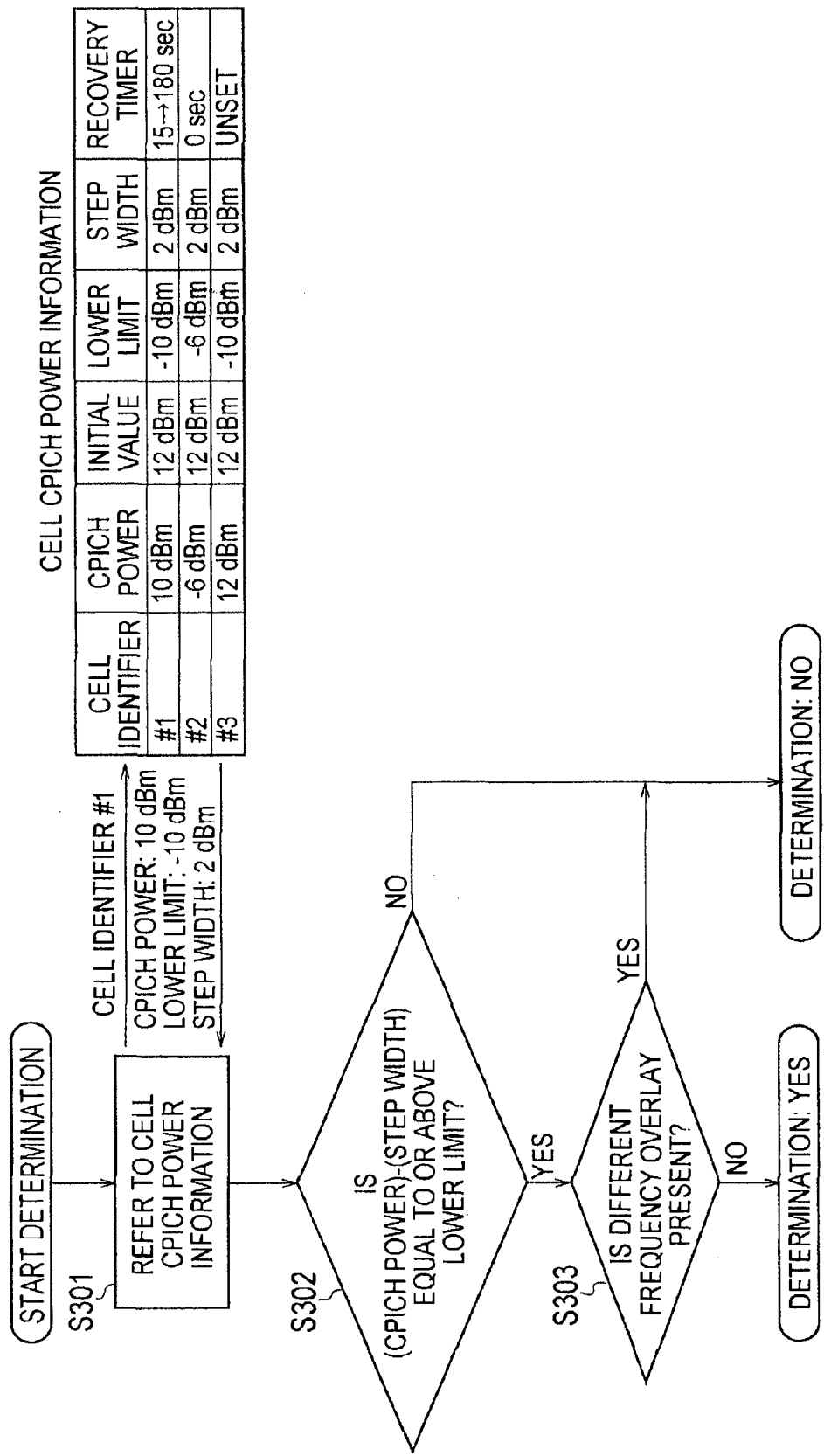
FIG. 6 is a flowchart showing an operation at the time of CPICH power reduction determination processing by the radio control station according to the first embodiment of the present invention.

As shown in FIG. 6, in step S301, the change determination unit 23 of the radio control station RNC acquires the "CPICH power (10 dBm in the example of FIG. 6)", the "lower limit (−6 dBm in the example of FIG. 6)", and the "step width (2 dBm in the example of FIG. 6)" corresponding to the "cell identifier (#1 in the example of FIG. 6)" of the femto cell 03 from the cell CPICH power information storage unit 22.

Here, the change determination unit 23 resets the "recovery timer" corresponding to the "cell identifier" (resets from 15 seconds to the initial value of 180 seconds in the example of FIG. 6).

If the "recovery time" is "unset", the change determination unit 23 sets the "recovery timer" to the initial value (such as 180 seconds).

In step S302, the change determination unit 23 determines whether or not a value obtained by subtracting the "step width" from the "CPICH power" is equal to or above the "lower limit".

The operation goes to step S303 when the value is determined to be equal to or above the "lower limit". If the value is determined to be not equal to or above the "lower limit", the change determination unit 23 determines a result of the CPICH power reduction determination processing as "No".

In step S303, the change determination unit 23 determines whether or not there is a different frequency cell which is overlaid on the femto cell 03.

When such a cell is determined to be present, the change determination unit 23 determines that there is a possibility that a communication service can be offered to the mobile station UE without reducing the transmission power of the pilot signal in the femto cell 03 but by guiding the mobile station UE to the different frequency cell instead, and therefore determines the result of the CPICH power reduction determination processing as "No".

In this case, the change determination unit 23 may be configured to instruct the mobile station UE to perform standby at the different frequency when releasing the radio line. Here, the presence of the different frequency cell only needs to be held in advance in station data in the radio control station RNC or the like.

On the other hand, the change determination unit 23 determines the result of the CPICH power reduction determination processing as "Yes" when such a cell is determined to be not present.

In this case, the change determination unit 23 updates the "CPICH power" in the cell CPICH power information storage unit 22 when receiving the "Cell Reconfiguration Response message (a cell reconfiguration response)" from the femto radio base station NodeB03.

Back to FIG. 3 again, when the result of the CPICH power reduction determination processing is "No", the operation is terminated in step S1012A without changing the transmission power of the pilot signal in the femto cell 03 by the femto radio base station NodeB03.

On the other hand, when the result of the CPICH power reduction determination processing is "Yes", the radio control station RNC transmits the "Cell Reconfiguration Request message (a cell reconfiguration request)" to the femto radio base station NodeB03 in step S1012B so as to instruct the femto radio base station NodeB03 to reduce the transmission power of the pilot signal in the femto cell 03 by the above-described "step width".

The femto radio base station NodeB03 reduces the transmission power of the pilot signal in the femto cell 03 by the above-described "step width" in step S1013B, and then transmits the "Cell Reconfiguration Response message (the cell reconfiguration response)" to the radio control station RNC in step S1014B.

Second, an operation to recover the transmission power of the pilot signal via the CPICH in the femto cell 03 under the control of the femto radio base station NodeB03 in the mobile communication system according to the first embodiment of the present invention will be described with reference to FIG. 7 and FIG. 8.

Figure 7:
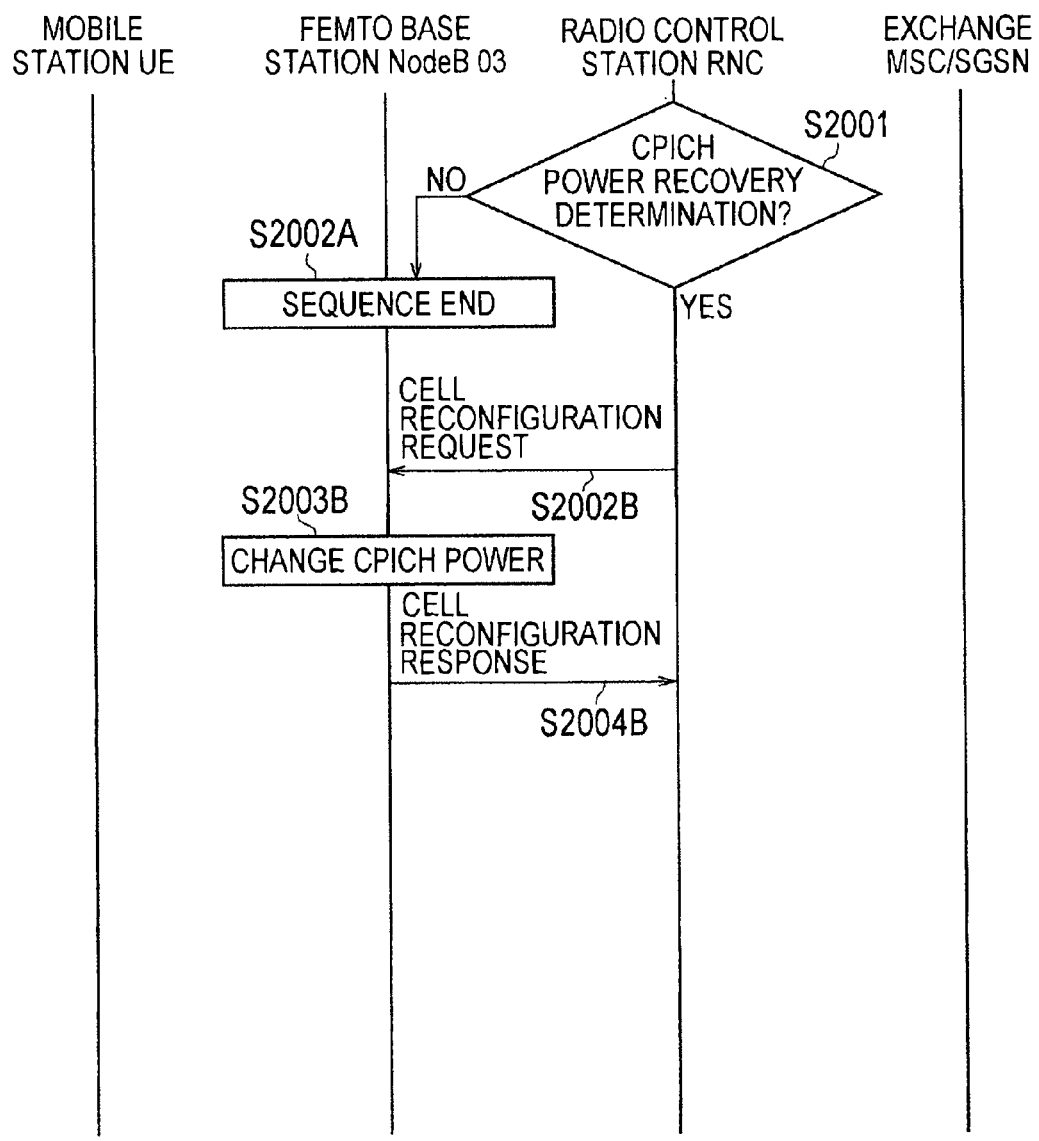
FIG. 7 is a sequence diagram showing an operation at the time of CPICH power recovery processing by the mobile communication system according to the first embodiment of the present invention.

As shown in FIG. 7, in step S2001, the radio control station RNC executes CPICH power recovery determination processing for determining whether or not to recover the transmission power of the pilot signal via the CPICH in the femto cell 03 under the control of the femto radio base station NodeB03.

Now, the CPICH power recovery determination processing will be described below with reference to FIG. 8. Note that the CPICH power recovery determination processing is started every second, for example, and is repeatedly executed for all the cells.

Figure 8:
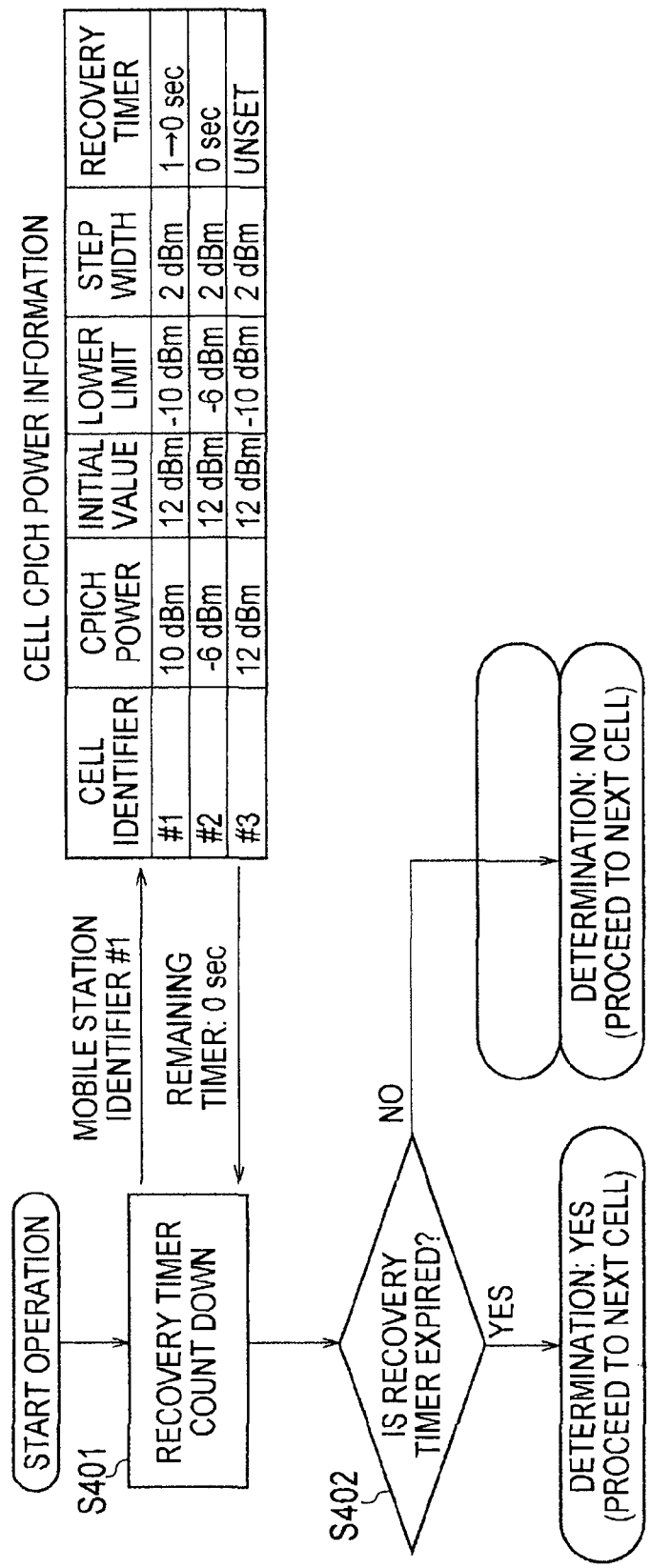
FIG. 8 is a flowchart showing an operation at the time of CPICH power recovery determination processing by the radio control station according to the first embodiment of the present invention.

As shown in FIG. 8, in step S401, the CPICH power information storage unit 22 decrements counts of the "recovery timer" corresponding to the "cell identifier" of the relevant cell.

When the "recovery timer" is not expired, i.e., when the "recovery timer" is not set to "0" in step S402, the CPICH power information storage unit 22 determines a result of the CPICH power recovery determination processing concerning the cell as "No" and starts the CPICH power recovery determination processing concerning the next cell.

On the other hand, when the "recovery timer" is expired, i.e., when the "recovery timer" is set to "0" in step S402, the CPICH power information storage unit 22 determines the result of the CPICH power recovery determination t processing concerning the cell as "Yes" and starts the CPICH power recovery determination processing concerning the next cell.

Here, when the "Cell Reconfiguration Response message (the cell reconfiguration response)" indicating that the result of the CPICH power recovery determination processing is determined as "Yes" and the transmission power of the pilot signal via the CPICH in the cell is turned back to the initial value is received from the femto cell 03, the change determination unit 23 sets the "CPICH power" for the femto cell 03 in the cell CPICH power information storage unit 22 to the "initial value" and causes the "recovery timer" for the femto cell 03 to transit to an "unset state".

Back to FIG. 7, when the result of the CPICH power recovery determination processing is "No", this operation is terminated in step S2002A without causing the femto radio base station NodeB03 to turn the transmission power of the pilot signal in the femto cell 03 back to the initial value.

On the other hand, when the result of the CPICH power recovery determination processing is "Yes", the radio control station RNC transmits the "Cell Reconfiguration Request message (the cell reconfiguration request)" in step S2002B so as to instruct the femto radio base station NodeB03 to turn the transmission power of the pilot signal in the femto cell 03 back to the "initial value".

After turning the transmission power of the pilot signal in the femto cell 03 back to the "initial value" in step S2003B, the femto radio base station NodeB03 transmits the "Cell Reconfiguration Response message (the cell reconfiguration response)" to the radio base station RNC in step S2004B.

In the example of FIG. 7 and FIG. 8, the cell CPICH power information storage unit 22 is configured to retain the "initial value", the "lower limit", the "step width", and the "recovery timer" individually in the form of numerical values. Instead, the cell CPICH power information storage unit 22 may be configured to allot "type numbers" to a typical set of numerical values and to retain the "type numbers" while being linked with the respective "cell identifiers". The type numbers and the set may be remotely changeable when the mobile communication system is in operation.

(Operations and Effects of Mobile Communication System According to First Embodiment of the Present Invention)

According to the mobile communication system of the first embodiment of the present invention, it is possible to offer a communication service outside the femto cell 03 to the mobile station UE that cannot establish the standby state in the femto cell 03, and thereby to improve a service performance.

Meanwhile, according to the mobile communication system of the first embodiment of the present invention, it is possible to save a battery of the mobile station UE and to improve convenience by avoiding repetition of cell selection processing and the location registration processing.

The mobile communication system according to the first embodiment of the present invention is configured to clear the number of times of rejection of the location registration processing of the mobile station UE with the location registration area including the femto cell 03 after the lapse of the predetermined time period. Therefore, it is possible control a trade-off relation between the offering of the communication service to the mobile station UE which cannot establish the standby state in the femto cell 03 and coverage of the femto cell 03 easily and flexibly.

According to the mobile communication system according to the first embodiment of the present invention, when the specific mobile station (the home mobile station) is in the course of communication in the femto cell 03, it is possible to ensure communication quality of the specific mobile station in the femto cell 03 by avoiding reduction of the transmission power of the pilot signal in the femto cell 03.

According to the mobile communication system according to the first embodiment of the present invention, it is also possible to avoid waste of the battery attributable to endless repetition of the location registration processing with the location registration area including the femto cell 03 to be executed by the mobile station UE which cannot establish the standby state in the femto cell 03.

According to the mobile communication system according to the first embodiment of the present invention, it is possible to appropriately control reduction in the transmission power of the pilot signal in the femto cell 03 by properly setting the "initial value", the "lower limit", the "step width", and so forth in the cell CPICH power information storage unit 22.

According to the mobile communication system according to the first embodiment of the present invention, when it is possible to guide the mobile station UE that cannot establish the standby state in the femto cell 03 to the different frequency cell overlaid on the femto cell 03, it is possible to avoid a concern to lose the coverage of the femto cell 03 more than necessary by avoiding reduction of the transmission power of the pilot signal in the femto cell 03.

According to the mobile communication system according to the first embodiment of the present invention, it is possible to turn the coverage of the femto cell 03 back to a wider state when the mobile station UE that cannot establish the standby state in the femto cell 03 is not located in the neighborhood area.

According to the mobile communication system according to the first embodiment of the present invention, it is possible to turn the transmission power of the pilot signal in the femto cell 03 by a remote operation and thereby to change the coverage of the femto cell 03 promptly and efficiently.

Modified Embodiment 1

Figure 9:
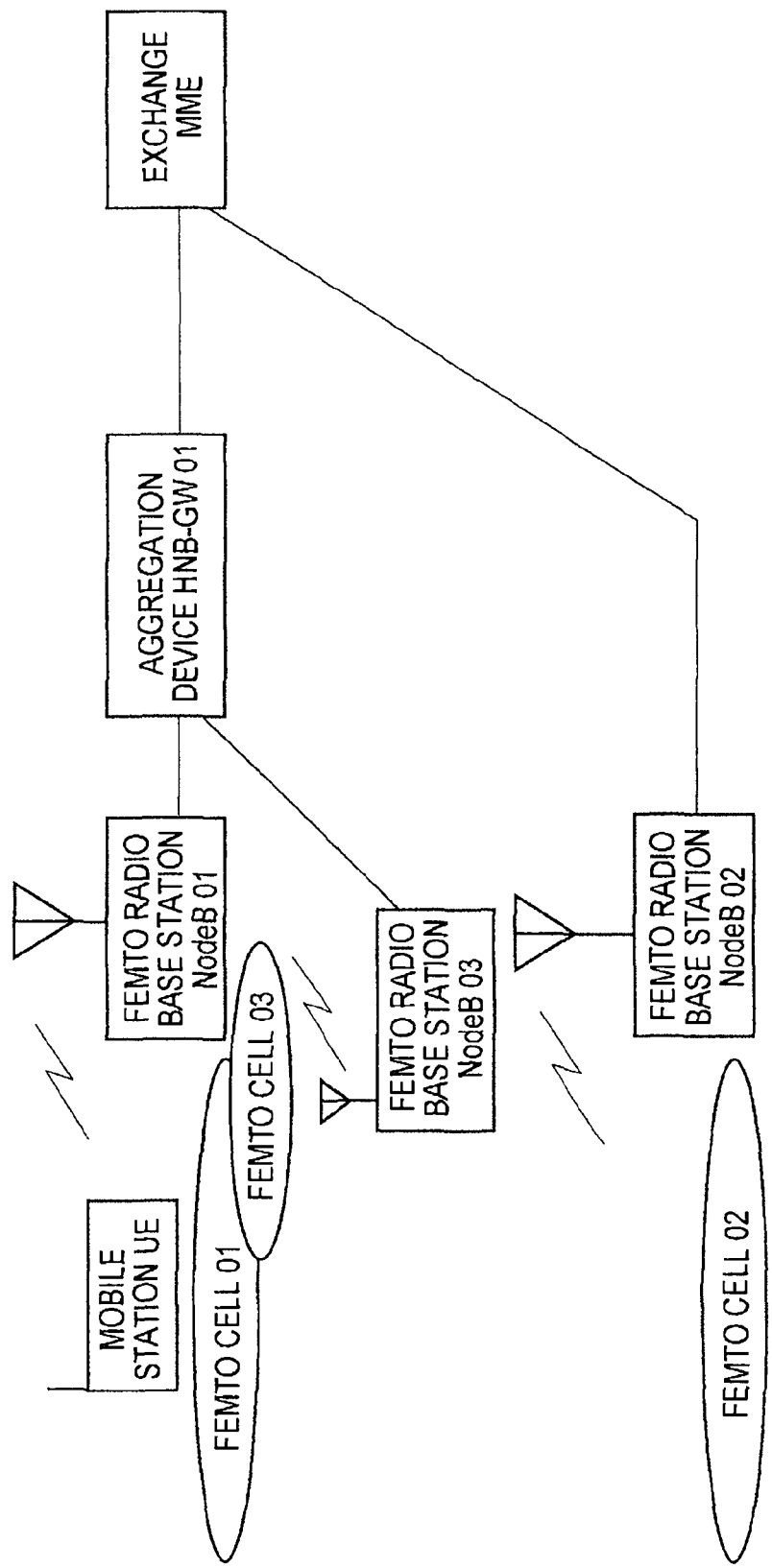
FIG. 9 is an overall configuration diagram of a mobile communication system according to Modified Embodiment 1 of the present invention.

The above-described embodiment has been explained by use of the mobile communication system of the W-CDMA scheme as the example. However, the present invention is not limited only to such mobile communication system but is also applicable to a mobile communication system of a LTE (Long Term Evolution) scheme as shown in FIG. 9, for instance.

In this case, the functions of the radio base station NodeB and the functions of the radio control station RNC will be loaded on a radio base station eNB.

For example, the change determination unit 23 provided in the radio control station RNC in the above-described embodiment may be included in the radio base station eNB in this modified embodiment.

Moreover, in this modified embodiment, the access determination unit 12 provided in the exchange MSC/SGSN in the above-described embodiment may be included in the radio base station eNB or in an aggregation device HNB-GW in this modified embodiment.

Modified Embodiment 2

Figure 10:
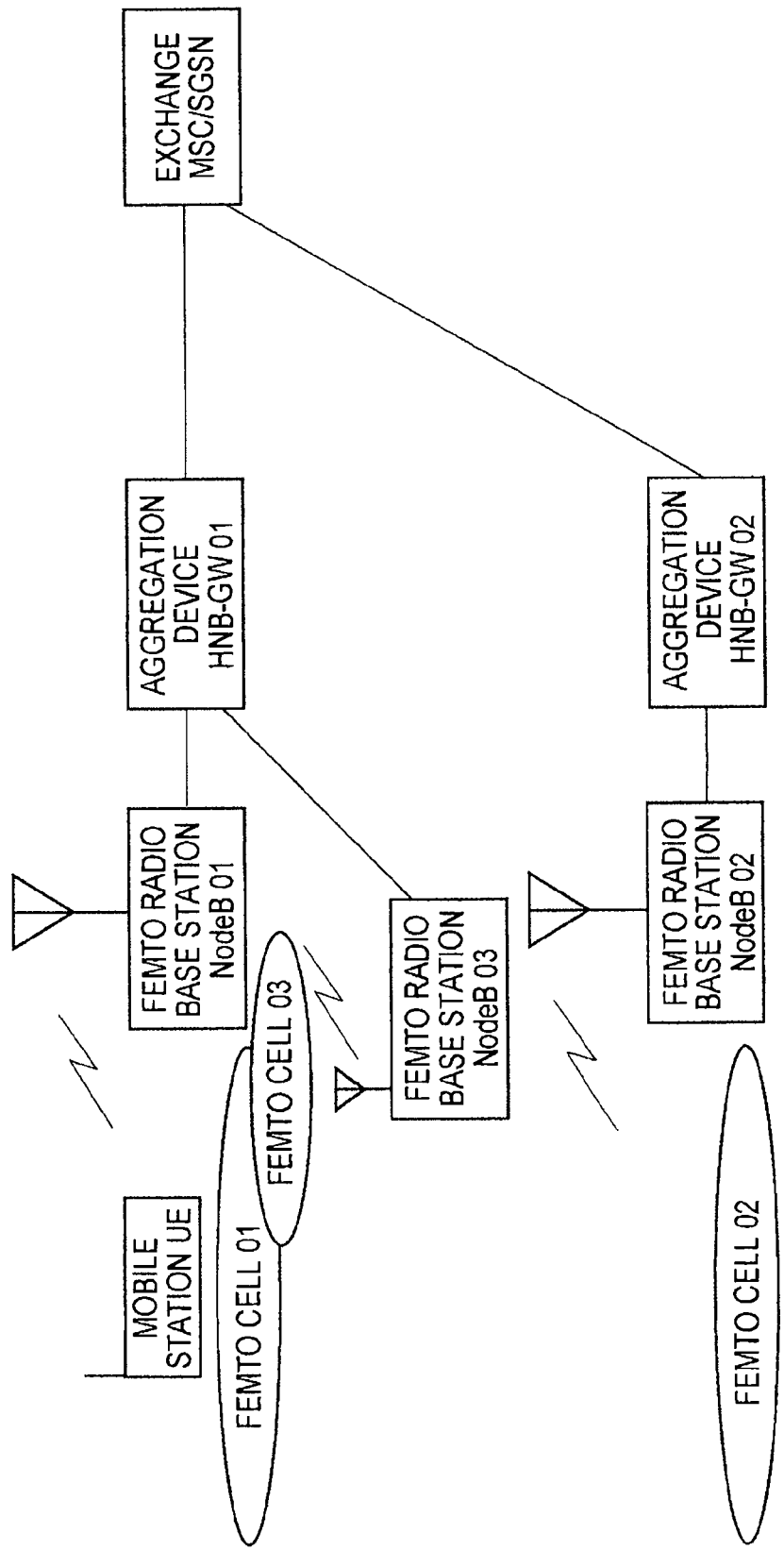
FIG. 10 is an overall configuration diagram of a mobile communication system according to Modified Embodiment 2 of the present invention.

Now, a mobile communication system according to Modified Embodiment 2 of the present invention will be described below with reference to FIG. 10. Here, the mobile communication system according to Modified Embodiment 2 of the present invention will be explained while focusing on differences from the mobile communication system according to the above-described first embodiment.

For example, the change determination unit 23 provided in the radio control station RNC in the above-described embodiment may be included in the radio base station NodeB in this modified embodiment.

Moreover, the access determination unit 12 provided in the exchange MSC/SGSN in the above-described embodiment may be included in any of the radio base station NodeB, the aggregation device HNB-GW, and the exchange MSC/SGSN in this modified embodiment.

Note that operation of the above described mobile station UE, the radio base station (the femto radio base station) NodeB(eNB), the exchange MSC/SGSN, the radio control station RNC, the aggregation device HNB-GW may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in mobile station UE, the radio base station (the femto radio base station) NodeB (eNB), the exchange MSC/SGSN, the radio control station RNC, the aggregation device HNB-GW. Also, the storage medium and the processor may be provided in mobile station UE, the radio base station (the femto radio base station) NodeB (eNB), the exchange MSC/SGSN, the radio control station RNC, the aggregation device HNB-GW as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

INDUSTRIAL APPLICABILITY

As has been described above, with the present invention, it is possible to provide a mobile communication method, a mobile communication system, a program, an exchange, and a specific radio base station, which are capable of offering a communication service outside the femto cell 03 to the mobile station UE that cannot enter the standby state in the femto cell 03, and of saving the battery of the mobile station UE and improving convenience by avoiding repetition of the cell selection processing and the location registration processing.

The invention claimed is:

1. A mobile communication method comprising:
    a step A of causing a mobile station to transmit a location registration request for requesting execution of location registration processing with a location registration area including a cell under the control of a specific radio base station based on a received pilot signal;
    a step B of causing a network apparatus to reject the location registration request when the mobile station is determined to be not allowed to access to the specific radio base station, and
    when the network apparatus receives the location registration request from the mobile station; and
    a step C of causing the network apparatus to make a decision to adjust transmission power of the pilot signal in the specific radio base station based on rejection of the location registration processing.

2. The mobile communication method according to claim 1,
    wherein the network apparatus accumulates the number of times of rejection of the location registration processing and clears the accumulated number of times of rejection of the location registration processing when the location registration processing is not rejected for a predetermined time period.

3. The mobile communication method according to claim 1,
    wherein, in the step D, the network apparatus determines whether or not to reduce the transmission power of the pilot signal in the specific radio base station depending on a communication status of a specific mobile station allowed to access to the specific radio base station.

4. The mobile communication method according to claim 1,
    wherein, even if the mobile station is determined to be not allowed to access to the specific radio base station, the network apparatus does not reject the location registration processing when the number of times of rejection of the location registration processing has exceeded a predetermined number of times.

5. The mobile communication method according to claim 1,
    wherein, in the step B, the network apparatus changes a factor to be included in a location registration rejection response to provide notification of rejection of the location registration processing depending on the number of times of the rejection of the location registration processing.

6. The mobile communication method according to claim 1,
    wherein, in the step C, the network apparatus determines whether or not to reduce the transmission power of the pilot signal in the specific radio base station depending on an overlay condition of another cell on the cell under the control of the specific radio base station.

7. The mobile communication method according to claim 1,
    wherein the network apparatus makes a decision to turn the transmission power of the pilot signal in the specific ration base station back to an initial value after a lapse of a predetermined time period.

8. A mobile communication system configured to cause a mobile station to transmit a location registration request for executing location registration processing with a location registration area including a cell under the control of a specific radio base station based on a received pilot signal, the mobile communication system comprising:
    an access determination unit configured to determine whether or not the mobile station is allowed to access to the specific radio base station based on the location registration request received from the mobile station;
    a location registration processor configured to reject the location registration processing when the mobile station is determined to be not allowed to access to the specific radio base station; and
    a change determination unit configured to make a decision to adjust transmission power of the pilot signal in the specific radio base station based on rejection of the location registration processing.

9. The mobile communication system according to claim 8, comprising:
    a storage unit accumulating the number of times of rejection of the location registration processing and being configured to clear the accumulated number of times of rejection of the location registration processing when the location registration processing is not rejected for a predetermined time period.

10. The mobile communication system according to claim 8,
    wherein the change determination unit determines whether or not to reduce the transmission power of the pilot signal in the specific radio base station depending on a communication status of a specific mobile station allowed to access to the specific radio base station.

11. The mobile communication system according to claim 8,
    wherein, even if the mobile station is determined to be not allowed to access to the specific radio base station, the location registration processor does not reject the location registration processing when the number of times of rejection of the location registration processing has exceeded a predetermined number of times.

12. The mobile communication system according to claim 8, wherein the location registration processor changes a factor to be included in a location registration rejection response to provide notification of rejection of the location registration processing depending on the number of times of the rejection of the location registration processing.

13. The mobile communication system according to claim 8, wherein the change determination unit determines whether or not to reduce the transmission power of the pilot signal in the specific radio base station depending on an overlay condition of another cell on the cell under the control of the specific radio base station.

14. The mobile communication system according to claim 8, wherein the change determination unit makes a decision to turn the transmission power of the pilot signal in the specific radio base station back to an initial value after a lapse of a predetermined time period.

15. A non-transitory computer-readable medium including a program causing a computer to operate as the mobile communication system according to claim 8.

16. An exchange configured to cause a mobile station to transmit a location registration request for executing location registration processing with a location registration area including a cell under the control of a specific radio base station based on a received pilot signal, the exchange comprising:

an access determination unit configured to determine whether or not the mobile station is allowed to access to the specific radio base station based on the location registration request received from the mobile station;

a location registration processor configured to reject the location registration processing when the mobile station is determined to be not allowed to access to the specific radio base station; and a change determination unit configured to make a decision to adjust transmission power of the pilot signal in the specific radio base station based on rejection of the location registration processing.

17. A specific radio base station configured to cause a mobile station to transmit a location registration request for executing location registration processing with a location registration area including a cell under the control of a specific radio base station based on a received pilot signal, the specific radio base station comprising:

an access determination unit configured to determine whether or not the mobile station is allowed to access to the specific radio base station based on the location registration request received from the mobile station;

a location registration processor configured to reject the location registration processing when the mobile station is determined to be not allowed to access to the specific radio base station; and a change determination unit configured to make a decision to adjust transmission power of the pilot signal in the specific radio base station based on rejection of the location registration processing exceeds a predetermined number of times.

* * * * *